United States Patent
Macko

Patent Number: 6,052,563
Date of Patent: Apr. 18, 2000

[54] COMMUNICATION DEVICE CONTROLLED BY APPOINTMENT INFORMATION STORED THEREIN, AND METHOD THEREFOR

[75] Inventor: William J. Macko, West Palm Beach, Fla.

[73] Assignee: Motorola, Schaumburg, Ill.

[21] Appl. No.: 08/988,077

[22] Filed: Dec. 10, 1997

[51] Int. Cl.$^7$ ...................................................... H04Q 7/00
[52] U.S. Cl. .......................................... 455/38.2; 455/38.4
[58] Field of Search .................................. 455/31.1, 38.2, 455/38.4; 701/204

[56] References Cited

U.S. PATENT DOCUMENTS

| | | |
|---|---|---|
| 4,894,649 | 1/1990 | Davis . |
| 5,416,473 | 5/1995 | Dulaney, III et al. . |
| 5,452,356 | 9/1995 | Albert ..................................... 455/33.1 |
| 5,790,974 | 8/1998 | Tognazzini ............................... 701/204 |

*Primary Examiner*—Salvatore Cangialosi
*Attorney, Agent, or Firm*—Pablo Meles

[57] ABSTRACT

A communication device (100) whose operations are synchronized to a stored appointment book (117). The communication device (100) comprises a controller (116) programmed to accept and store an appointment book (117) including information representing daily appointments and configuration information (119) specifying actions to be performed by the communication device with respect to the daily appointments. The controller monitors the appointment book in real time and perform actions saynchronized to the appointment book (117).

23 Claims, 12 Drawing Sheets

| TYPE/ SUBTYPE | UNCONDITIONAL ACTIONS | | | | CONDITIONAL ACTIONS | | | | | |
|---|---|---|---|---|---|---|---|---|---|---|
| | ADDR. | MSG. TO BE SENT | Δt (IMMED. OR AT APPT.) | .EXE MODE | IF RCVD: ADDR. | SUBJ. | CONTENT | ADDR. | THEN SEND: CONT | ALERT |
| -- HOME -- | -- NONE -- | | | | -- ANY -- | | | REPLY TO SENDER | "IF URGENT, CALL ME AT HOME" | SILENT |
| STAFF MEETING/ LEADING | (GET ADDRS. FROM APPT. ENTRY) | "MEETING IN 10 MIN." | -10 | | BOSS | | | | -- NONE -- | CHIRP |
| | | | | | | | 911 | REPLY TO SENDER | "I'LL GET WITH YOU ASAP" | SPECIAL BEEP |
| | | | | | -- ANYTHING ELSE -- | | | REPLY TO SENDER | "I'M IN MEETING. AVAIL. AT." (CHECK APPT. BOOK) | SILENT |
| MEETING/ ATTENDEE | | | | | WIFE | | | | -- NONE -- | STANDARD BEEP |
| | | | | | | | 911 | REPLY TO SENDER | "I'LL GET WITH YOU ASAP" | SPECIAL BEEP |
| | | | | | -- ANYTHING ELSE -- | | | | -- NONE -- | VIB |
| LUNCH | SECRETARY | "AT LUNCH" | | | | | | | | |
| OUT OF OFFICE | SECRETARY | "AT;" (GET LOCATION FROM APPT. BOOK) | FORWARD E-MAIL (AT APPT. TIME) | | BOSS | | | REPLY TO SENDER | "AT" (GET LOC FROM APPT. BOOK) | VIB |
| | | | | | -- ANYTHING ELSE -- | | | REPLY TO SENDER | "UNAVAILABLE" | SILENT |
| TRAVEL | SECRETARY | | (IMMEDIATE) CHECK FOR AIRLINE SCHEDULES AND PRICES | | SECRETARY -- | | | | | |
| DO NOT DISTURB | SECRETARY | "HANDLE ALL CALLS" | | | SECRETARY | | | | | |
| | | | | | -- ANYTHING ELSE -- | | | FORWARD TO SEC. | (CONTENTS OF REC.'D MSG) | STANDARD BEEP | ns

COMMUNICATION DEVICE CONTROLLED BY APPOINTMENT INFORMATION STORED THEREIN, AND METHOD THEREFOR

FIELD OF THE INVENTION

The present invention is directed a communication device, and more particularly to controlling actions to be automatically performed in a communication device based on appointment book information stored in the communication device.

BACKGROUND OF THE INVENTION

The features of portable communication devices, such as selective call communication devices (one-way and two-way pagers) or cellular telephones, allow a user to control the operation of the device. For example, some devices permit a user to manually set the device to a silent alert mode when it is desired not to be disturbed by an audible alert. However, in order to turn off the silent alert mode and revert to an audible alert, the user must remember to make the change.

This task has been automated to a limited degree with the advent of an "auto-off/auto-on" feature in which a particular action is set to occur for a particular predetermined time period. However, in many situations, controlling the operation of the device based upon time is not the optimum mechanism. For example, the user may encounter situations in which a return to a "normal" operation is desired, though without the need to manually intervene and change the device operation.

A better way to control the operation of a communication device is by synchronizing the operation of it to a user's appointment book or daily activity calendar.

BRIEF DESCRIPTION OF THE DRAWINGS

FIG. 12 is a diagram showing a table of configuration information associated with the appointment book entries of FIG. 11.

DESCRIPTION OF A PREFERRED EMBODIMENT

Figure 1:
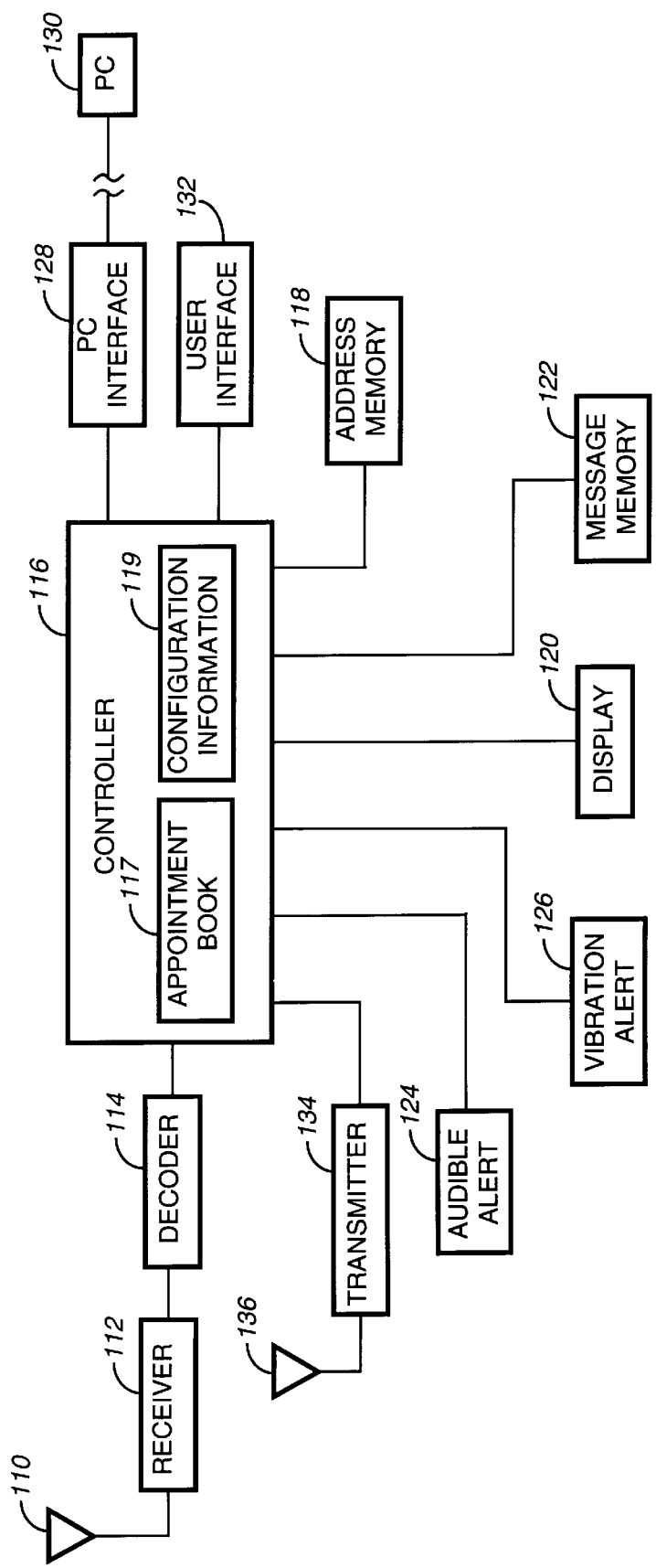
FIG. 1 is a block diagram of a communication device suitable for synchronization to events in a stored appointment book calendar.

Referring first to FIG. 1, a communication device for use in accordance with the present invention is shown at 100. The communication device 100 is, for example, a selective call communication device preferably having two way communication capability. The present invention involves configuring the communication device 100 to synchronize its operations with information in a daily appointment book or schedule for a user.

The communication device 100 comprises an antenna 110 for receiving radio frequency (RF) signals and a receiver 112 for processing the RF signals to recover digital data, voice data, etc., modulated on the RF signals. A decoder 114 coupled to the receiver 112 decodes the digital data to extract address information, message information, and/or control information. A controller 116 connected to the decoder processes the information decoded by the decoder 114 and is the overall control point for the communication device 100. The decoder 114 decodes the digital data in accordance with a predetermined protocol, such as Motorola's FLEX™ paging protocol technology, for example.

The controller 116 compares received address information with stored addresses in an address memory 118 to determine whether a message associated with a received address is assigned to the particular communication device. If it corresponds to a stored address, the message is displayed on a display 120 and/or stored in a message memory 122. In addition, an audible alert may be generated on the audible alert device 124 or a silent/vibration alert on the vibration alert device 126. Other actions may be performed depending on which of the stored addresses a message is received.

Information stored in the communication device may be synchronized with information managed by a companion appointment book program in a personal computer (PC) 130 by way of a PC interface 128. User input into the communication device is made through a user interface 132, which is a keypad, select buttons, touchscreen, or pen-input, etc., as is well known in the art.

In addition, the communication device 100 preferably includes two-way communication capability. Messages generated by the controller 116 are transmitted via the transmitter 134 and antenna 136.

Figure 2:
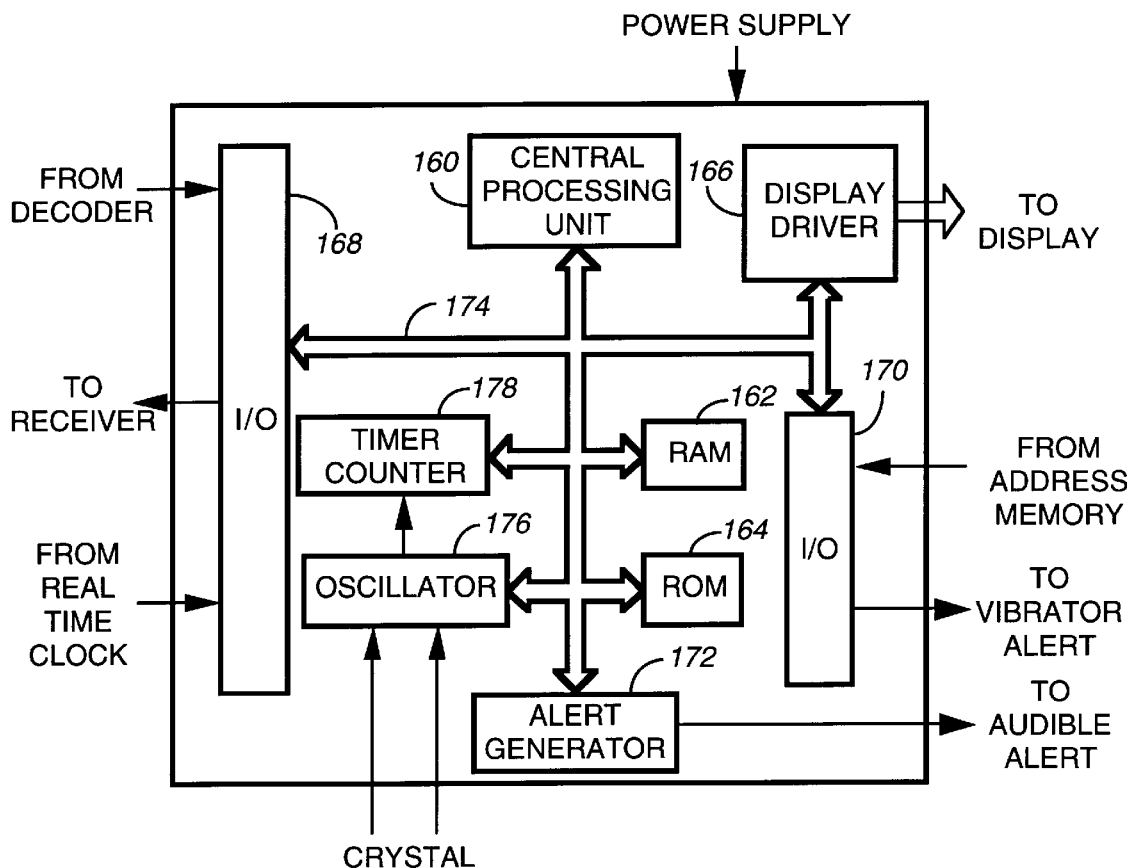
FIG. 2 is a block diagram of a controller suitable for use as a controller in the communication device shown in FIG. 1.

The controller 116 is embodied by a microprocessor based device, for example, and includes stored information for controlling the operation of the communication device. FIG. 2 shows the controller 116 in greater detail. The controller 116 comprises a central processing unit 160, a random access memory (RAM) 162, a read only memory (ROM) 164 and several other components to be explained hereinafter. The ROM 164 stores control information for the communication device which is designed not to be altered after it is stored therein. This includes basic user interface operations, receiver control operations, etc. The RAM 162 stores information that is changeable as the communication device is operated, including a calendar or appointment book 117 comprising information representing a daily appointment schedule of a user and configuration information 119 specifying actions to be taken by the communication device depending on when the information is received with respect to the calendar. The controller 116 further comprises a display driver 166 which generates signals to drive the display 120.

A first input/output (I/O) unit 168 receives decoded information from the decoder 114 and supplies control information to the receiver 112 to control when the receiver is turned on and off. A second I/O unit 170 receives address information from the address memory 118 and also supplies control signals to the vibration alert 126. An alert generator 172 generates a control signal for the audible alert 124.

The central processing unit 160 communicates with the other elements in the controller 116 by way of the bus 174. The timing of the controller 116 is controlled by a crystal driven oscillator 176 and timer counter 178.

As will become more apparent hereinafter, the controller is programmed to store and maintain a calendar or appointment book 117 including information representing daily appointments and configuration information 119 specifying actions to be performed by the communication device with respect to the daily appointments including at least one of: transmitting a conditional response message, transmitting an unconditional outgoing message, generating a particular alert in response to receiving a message during an appointment, changing an operational mode of the communication device or executing a stored application.

Figure 3:
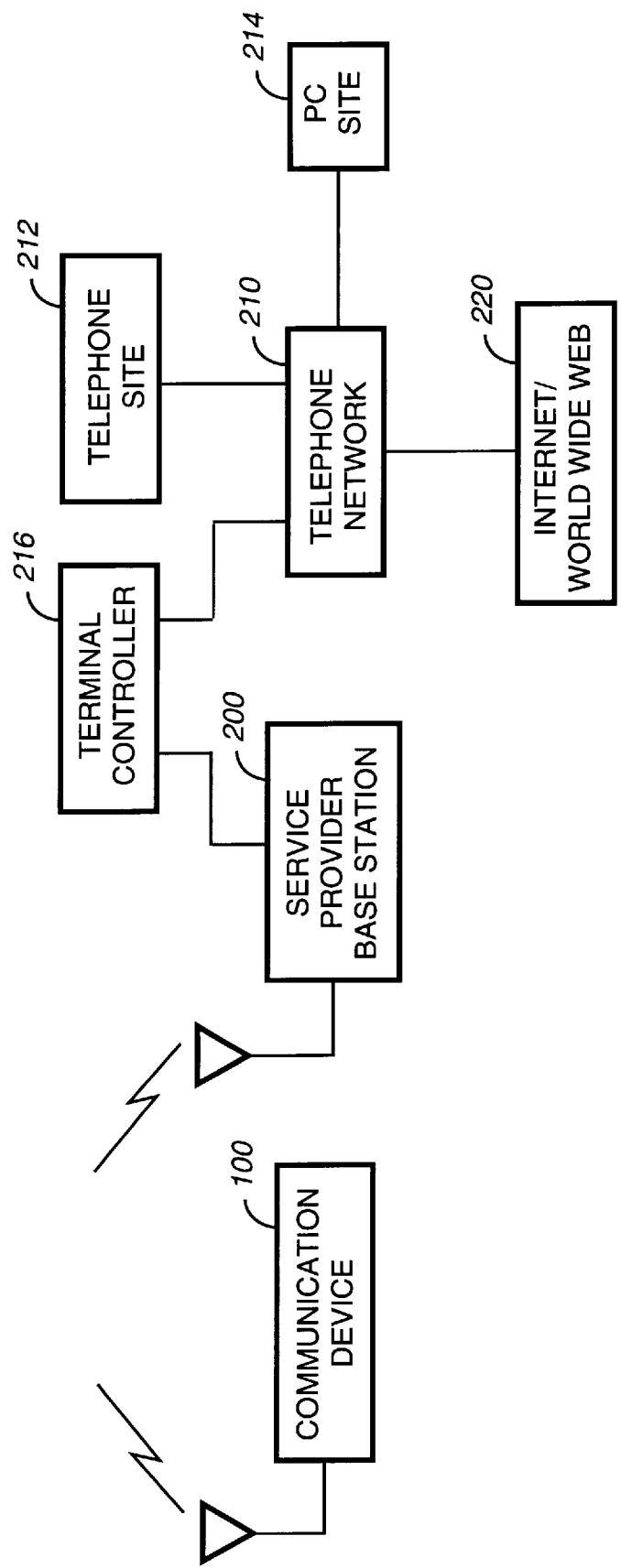
FIG. 3 is a block diagram of a communication system in which information is communicated between the communication device of FIG. 1 and other elements of a communication system.

Turning to FIG. 3, the communication device 100 communicates with other elements in a communication system 190. The communication system 190 includes a service provider base station 200. The service provider base station 200 is connected to a terminal controller 216, which in turn is connected to a telephone network 210. Various communication devices are connected to the telephone network 210, such as a convention telephone site 212 or a PC site 214 consisting of a PC and modem. In addition, the terminal controller 216 is connected to the internet/world wide web 220.

The service provider base station 200 communicates with communication devices 100 under control of the terminal controller 216. Messages to be transmitted to the communication device 100 from the telephone site 212, PC site 214 or the internet/world wide web 220 are received by the terminal controller 216 and processed for transmission by the service provider base station 200.

Figure 4:
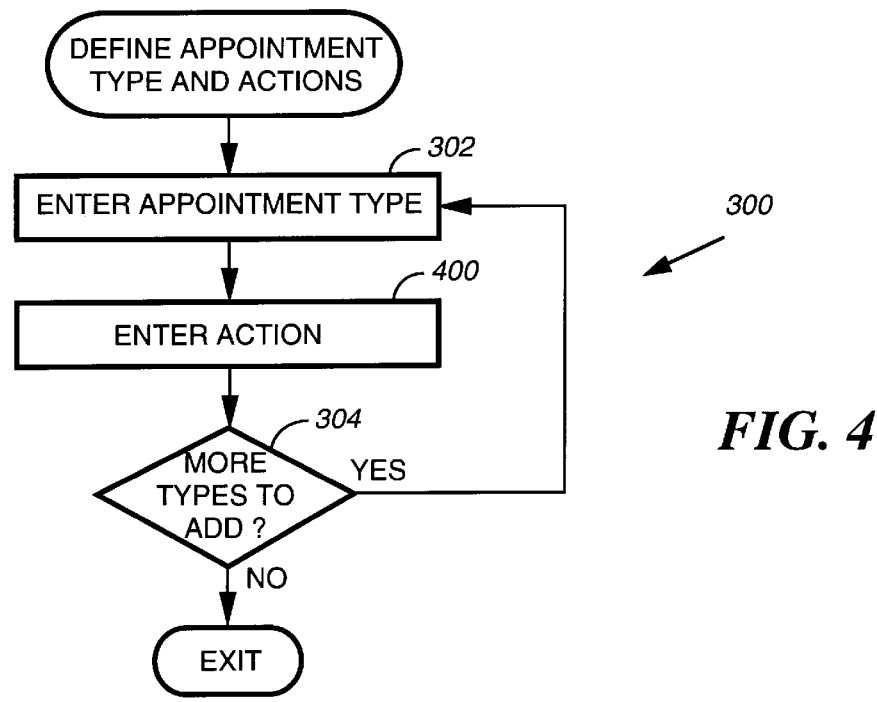
FIG. 4 is a flow chart generally showing how appointments and corresponding actions are entered according to the present invention.

FIG. 4 shows the general configuration information entry procedure 300 for defining appointment types and actions. In step 302, an appointment type is entered. Appointment types are names given to the types of daily appointments that the user enters, and include, for example, "meeting", "business trip", "lunch", "vacation", "do not disturb", etc. Each appointment type may have sub-types or sub-categories which are also entered in step 302. In step 400, the action to be performed for that appointment type or appointment sub-type is entered. The procedure for entering the action will be described in conjunction with FIGS. 5 and 6. In step 304, it is determined whether additional appointment types are to be entered, and if not, the procedure ends.

Figure 5:
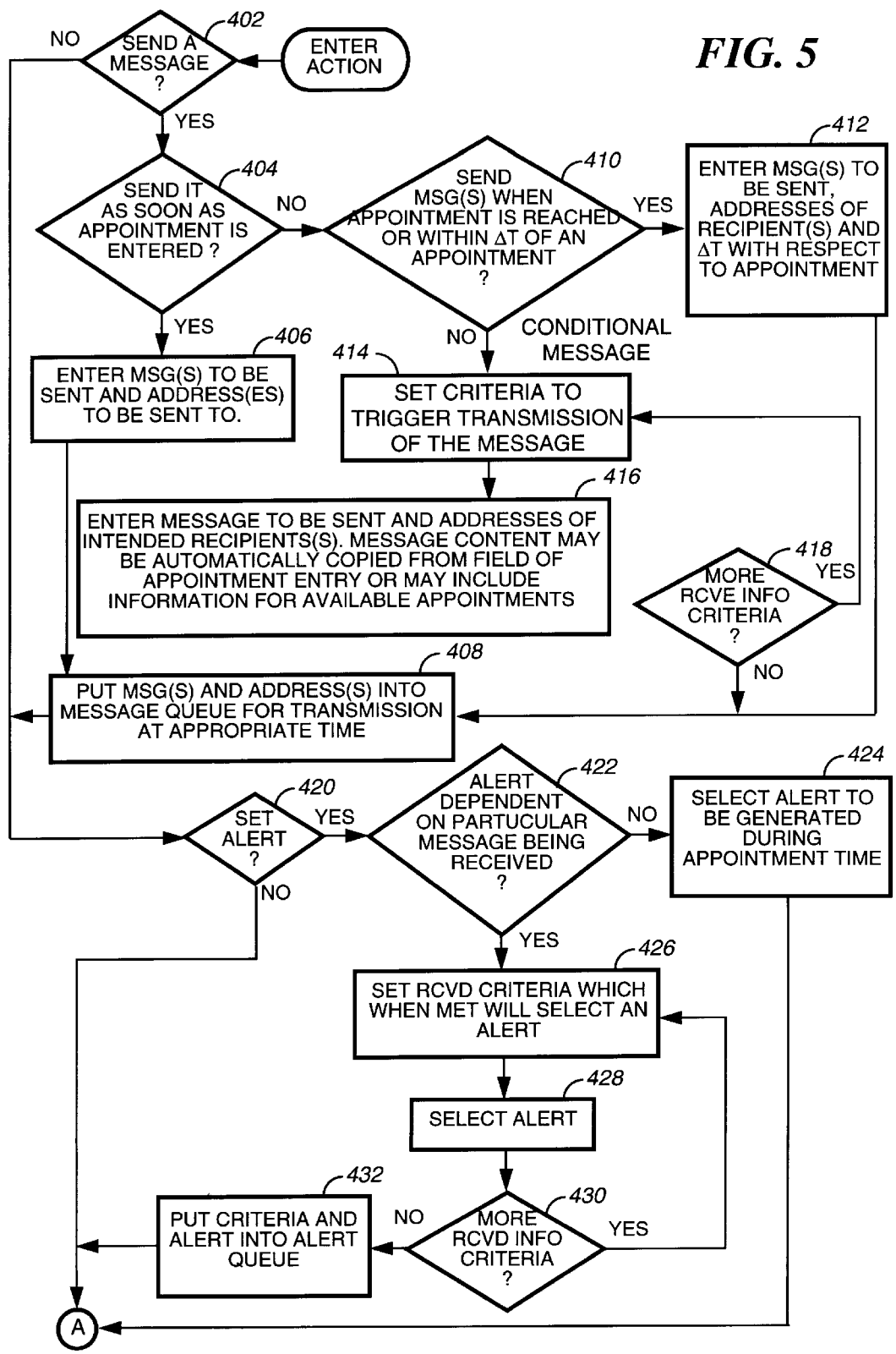
FIGS. 5 and 6 illustrate a flow chart for an action entry routine according to the present invention.
Figure 6:
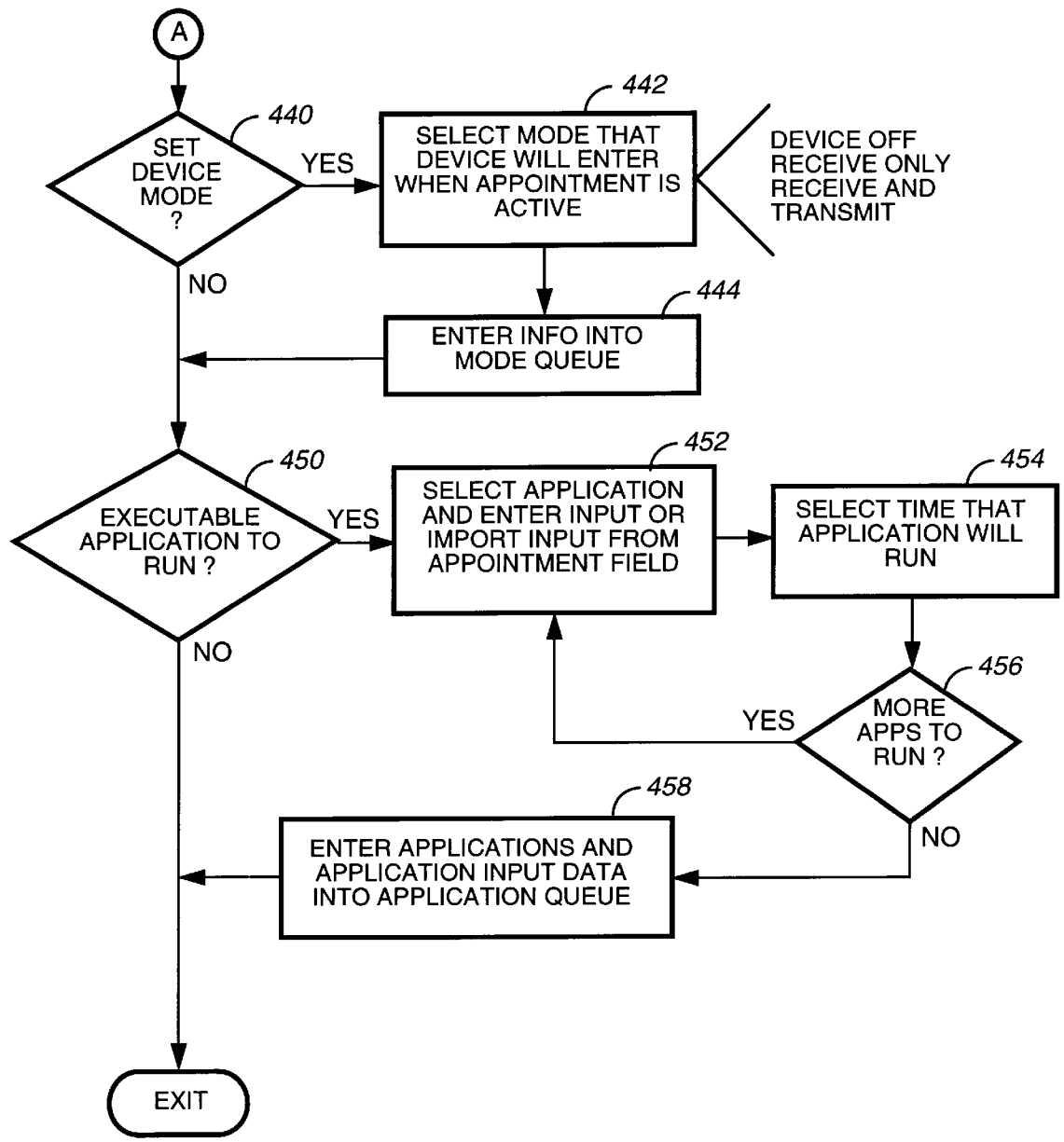

Referring now to FIGS. 5 and 6, the procedure for entering an action to be performed in association with an appointment will be described. The actions are divided into two categories: unconditional actions or conditional actions. Unconditional actions are performed independent of any other events, but are tied to an appointment. Conditional actions are performed only if a particular event occurs with respect to an appointment. In step 402, the user is queried to determine whether the action to be performed for the particular appointment type or sub-type is to send a message. If it is, then several steps are performed to ascertain when the message is to be sent. In step 404, the user is prompted to enter whether the message is to be sent as soon as the appointment is entered. For example, it is useful to transmit a message to those attending a meeting, prior to the start of the meeting. The message is transmitted to the terminal controller which converts it to an electronic mail message or wireless message (to a pager or cellular telephone) that is transmitted to each addressed party (attendees of the meeting).

If the message is to be sent as soon as the appointment is entered, then in step 406, the text of the message is entered as well as the address of the party to whom it is to be sent, such as pager address, electronic-mail address, etc. Then in step 408, the messages entered in step 406 are put into a message queue for transmission either immediately or at the appropriate time.

If the message is not to be sent as soon as the appointment is entered, then in step 410, the user is queried as to whether the message is to be sent as soon as the scheduled appointment time occurs. That is, step 410 permits the user to designate the message as an unconditional one, which is transmitted as soon as the appointment time is reached or within a predetermined period of time before or after the appointment, or a conditional one, which is transmitted if a message is received during the appointment time. If the message is an unconditional one, then in step 412, the message is entered along with an address of the party to whom it is to be sent. In addition, if the message is to be sent a predetermined period of time before or after the appointment, this predetermined period of time information is entered in step 412. If the message is a conditional one, then in step 414, the condition which must be met in order to trigger the transmission of the message is entered. Such conditions or predetermined criteria include matching particular words, numbers or combination thereof in at least one of a source of the incoming message, subject of the incoming message, or content of the incoming message. The address of the communication device on which the message is received may be viewed as a source of the message, as well as the content of the "From" or "Address" portion of a incoming message. For example, the controller of the communication device is programmed to transmit stored response messages in response to receiving an incoming message that matches certain criteria. The controller stores predetermined criteria for triggering transmission of a predetermined response message.

In step 416, the message to be transmitted is entered as well as the address of the party to whom it is to be sent. In step 418, the user is prompted to enter additional messages and triggering criteria.

The message(s) entered in steps 406, 412 and 416 alternatively includes information automatically copied from a fields or fields of the corresponding appointment.

Alternatively, if the message is a conditional response message, then in step 416, the user may designate that the message include information derived from the appointment book indicating the times of available appointment slots within a predetermined period of time, such as during that same day, that same week, that same month, etc.

In step 420, the user is prompted to set the alert as one of the possible actions. The user is prompted to set the alert as being dependent on a particular message being received. If the alert is not to be dependent on a particular received message, then in step 424, the user is prompted to select the alert to be generated during the appointment time, such as a chirp, loud alert, tone, vibrate alert, predetermined melody, etc. Otherwise, in step 426, the predetermined set of criteria for selecting the alert is set, such as receiving a message during the corresponding appointment time from a particular party, a message including at least one of a particular content, subject, or a source. Then in step 428, the user is prompted to select the alert. The user is prompted to enter additional criteria in step 430, and ultimately in step 432, the criteria and selected alert are entered into an alert queue.

Continuing to FIG. 6, in step 440, the user is prompted to set a device mode change as a particular action to be performed. In step 442, the user enters the mode that the device is to enter when the corresponding appointment is reached. The modes that the device can enter include, "device off", "receive only", and "receive and transmit". In step 444, the mode selection information is entered into a mode queue.

In step 450, the user is prompted to select an application to execute as an action to be performed. In step 452, the user selects the application to run and provides any necessary application input, or copies the application input from a field of an appointment. In step 454, the time that the application is to be executed is selected, such as when the appointment entry is made, or at a time referenced to the time of the appointment. In step 456, the user is prompted to enter additional applications. In step 458, the applications and corresponding application input is entered into an application queue.

In summary, the action entry routine of FIGS. 5 and 6 generate several queues for the different types of actions that can be taken. These queues are the message queue, alert queue, device mode queue and application queue. The contents of these queues are accessed at appropriate times in order to control the operation of the communication device accordingly.

Figure 7:
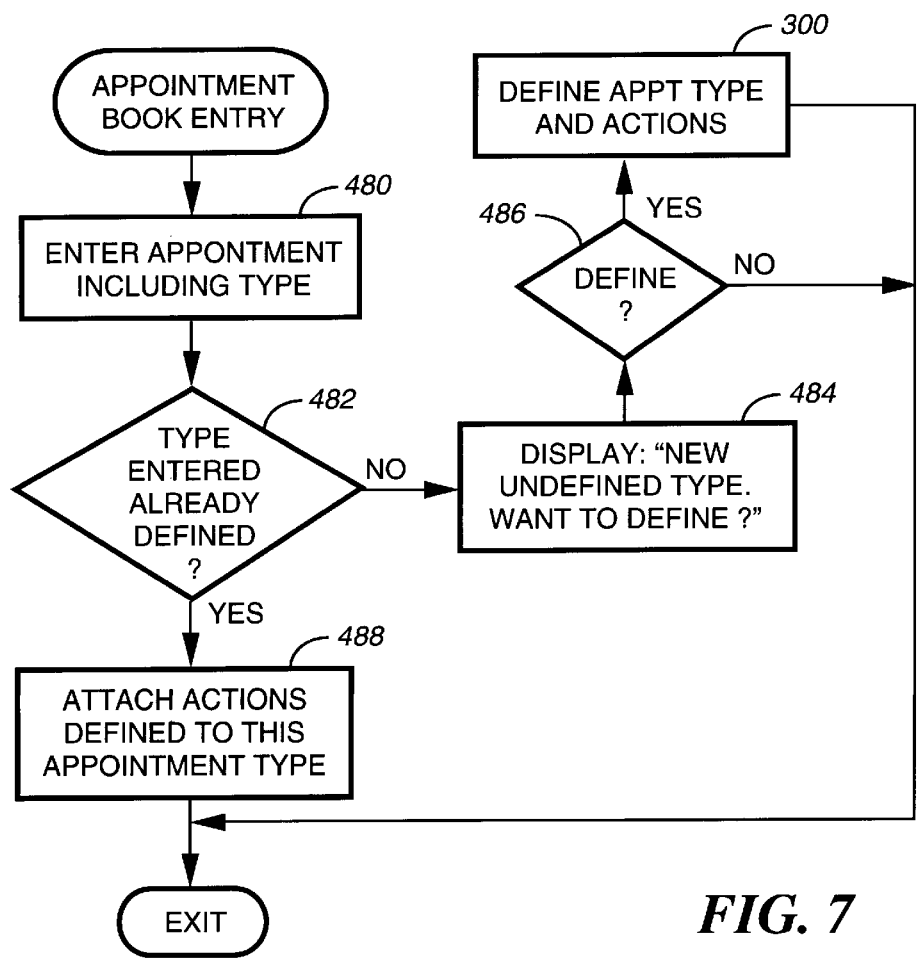
FIG. 7 is a flow chart showing in more detail an appointment book entry routine according to the present invention.

FIG. 7 illustrates a procedure for making an appointment book entry. In step 480, the appointment is entered, including the appointment type. In step 482, it is determined whether the appointment type corresponds to one already defined. If not, then in step 484, a message is displayed to the user informing that the appointment type is undefined. The user is prompted in step 486 to define the appointment type, and if so desired, the appointment type is defined according to the procedure 300, shown in FIG. 4. Otherwise, in step 488, the actions for the corresponding appointment type are attached and noted for processing at the appropriate time.

Figure 8:
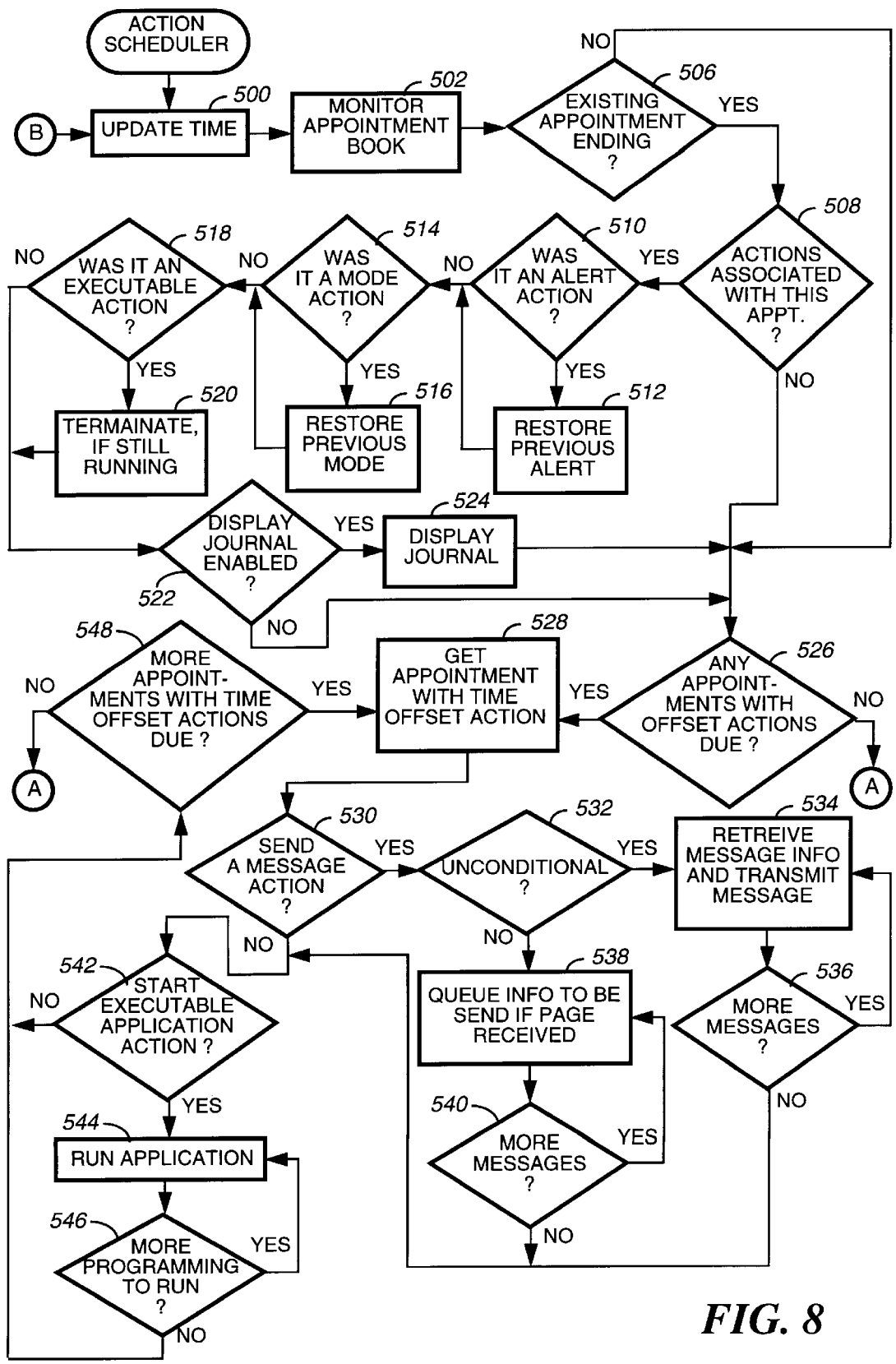
FIGS. 8 and 9 depict a flow chart of an action scheduler routine according to the present invention.
Figure 9:
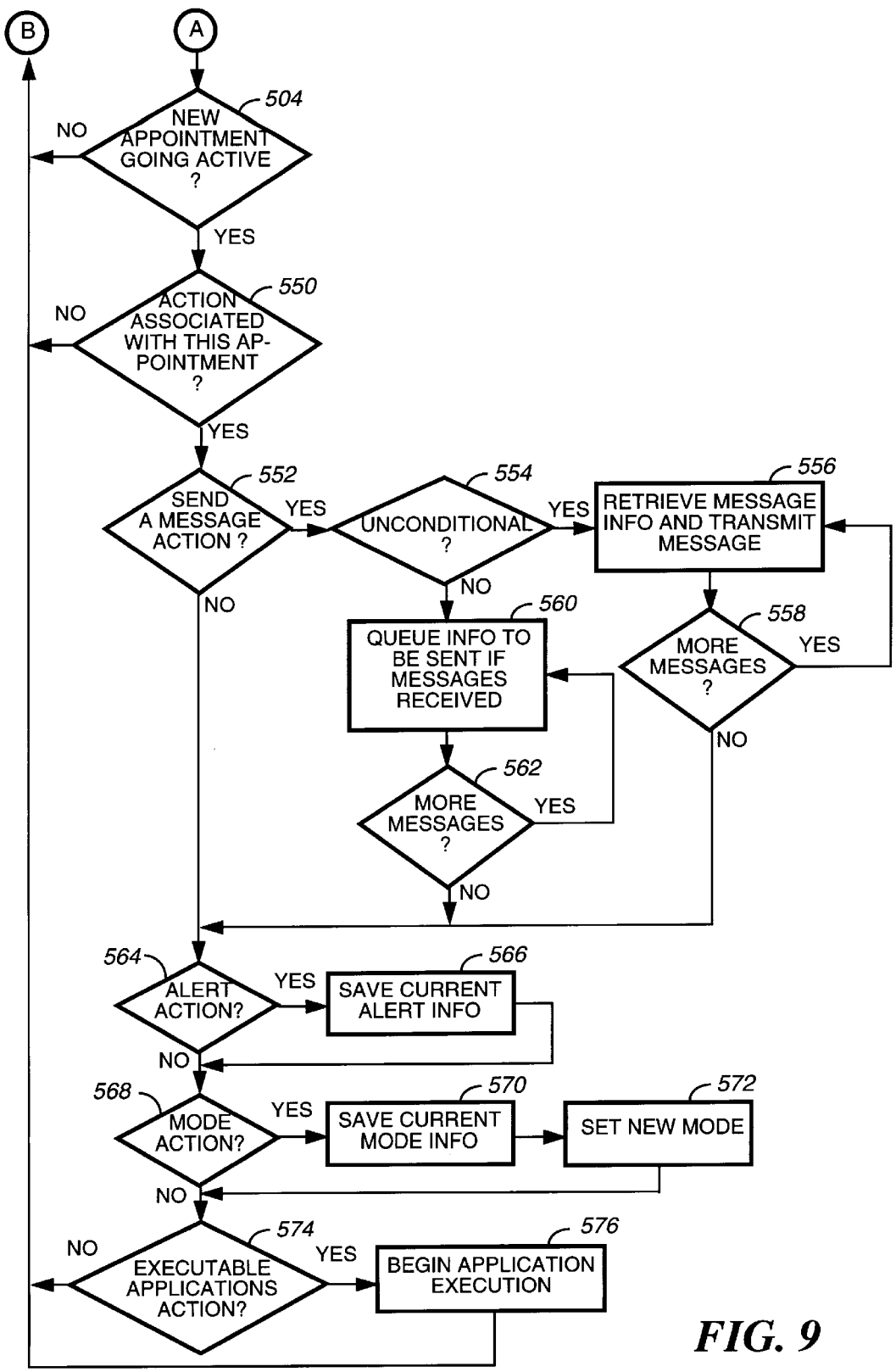

The communication device operates an action scheduler routine shown in FIGS. 8 and 9. The action scheduler routine is always running and constantly synchronizes the operation of the communication device with the entries in the appointment book. The controller performs conditional actions in response to detecting predetermined events during an appointment and performs unconditional actions within a predetermined period of time before or after a corresponding appointment independent of any events during the corresponding appointment.

In step 500, the current time is updated. In step 502, the data associated with the appointment book is monitored. In step 506, it is determined whether an appointment is ending. If the appointment is ending, then in step 508, it is determined whether there are any programmed actions associated with the current appointment that is about to end.

If there are actions associated with the appointment that is about to end, then in step 510, if the action was an alert action, the communication device is reverted to a previous or default alert mode in step 512. If it is determined that a programmed action was a device mode in step 514, then the device automatically reverts back to its previous mode or a default mode in step 516. If in step 518 it is determined that the programmed action was an executable application, then in step 520, the application is terminated if it is still running. In step 522, if it is determined that the action was to display a journal of actions performed during the appointment that has just completed or ended, then in step 524, the journal is displayed, optionally with a simultaneous alert.

If in step 508 it is determined that there are no actions associated with the appointment that is about to end, then in step 526, it is determined whether there are any appointments with time offset actions that are due to be performed. If there are appointments with time offset actions, then in step 528, the data is retrieved for that appointment with the time offset actions. Then in step 530, it is determined whether an action associated with that appointment is to send a message. If there is a send a message action programmed, then in step 532, it is determined whether the outgoing message is an unconditional one. An unconditional outgoing message is retrieved and transmitted in step 534 and any additional messages are also retrieved and transmitted via step 536.

If the outgoing message is a conditional one, then in step 538, the address, content and subject information for the message to be sent are queued for transmission. Any additional messages associated with the appointment are also queued via step 540. The messages to be transmitted may be stored in a queue of messages to be transmitted. The queue can be displayed for review by a user to allow the user to send or cancel a message.

In step 542, it is determined whether there is a executable application programmed to be performed at a time offset from an appointment. If so, then in step 544, the application is executed, and if it is determined in step 546 that there are additional applications to execute, then step 544 is repeated.

In step 548, it is determined whether there are additional appointments with time offset actions due, and if so, steps 528–546 are repeated.

Turning to FIG. 9 for the remainder of the action scheduler routine, in step 504 it is determined whether a new appointment is going active. If not, then the process returns to step 500. Otherwise, in step 550, it is determined whether there is a programmed action associated with the new appointment. If so, then in step 552, it is determined whether the action is to send a message (outgoing message) action.

If there is an outgoing message action associated with the appointment, then in step 554, it is determined whether it is an unconditional message. An unconditional message is processed in step 556 by retrieving the message to be sent and transmitting it. Additional unconditional messages are processed via step 558. A conditional message is processed in step 560 by placing the information (message content, address, etc.) in a queue to be sent if the criteria for sending the message is met. The same process is performed for each conditional message via step 562.

In step 564, it is determined whether there is an alert action associated with the new appointment. If there is, then in step 566, the current alert mode information for the appointment is saved so that it can be reverted to at the end of the appointment. The new alert mode is not immediately set, particularly when the alert is dependent upon matching criteria associated with an incoming message, and perhaps the source of the incoming message.

In step 568, it is determined whether there is a device mode action associated with the new appointment. If there is, then in step 570, the current device mode is saved, and in step 572, the new mode is set.

In step 574, it is determined whether there is an executable application action associated with the new appointment. If there is, then in step 576, the application is executed.

Figure 10:
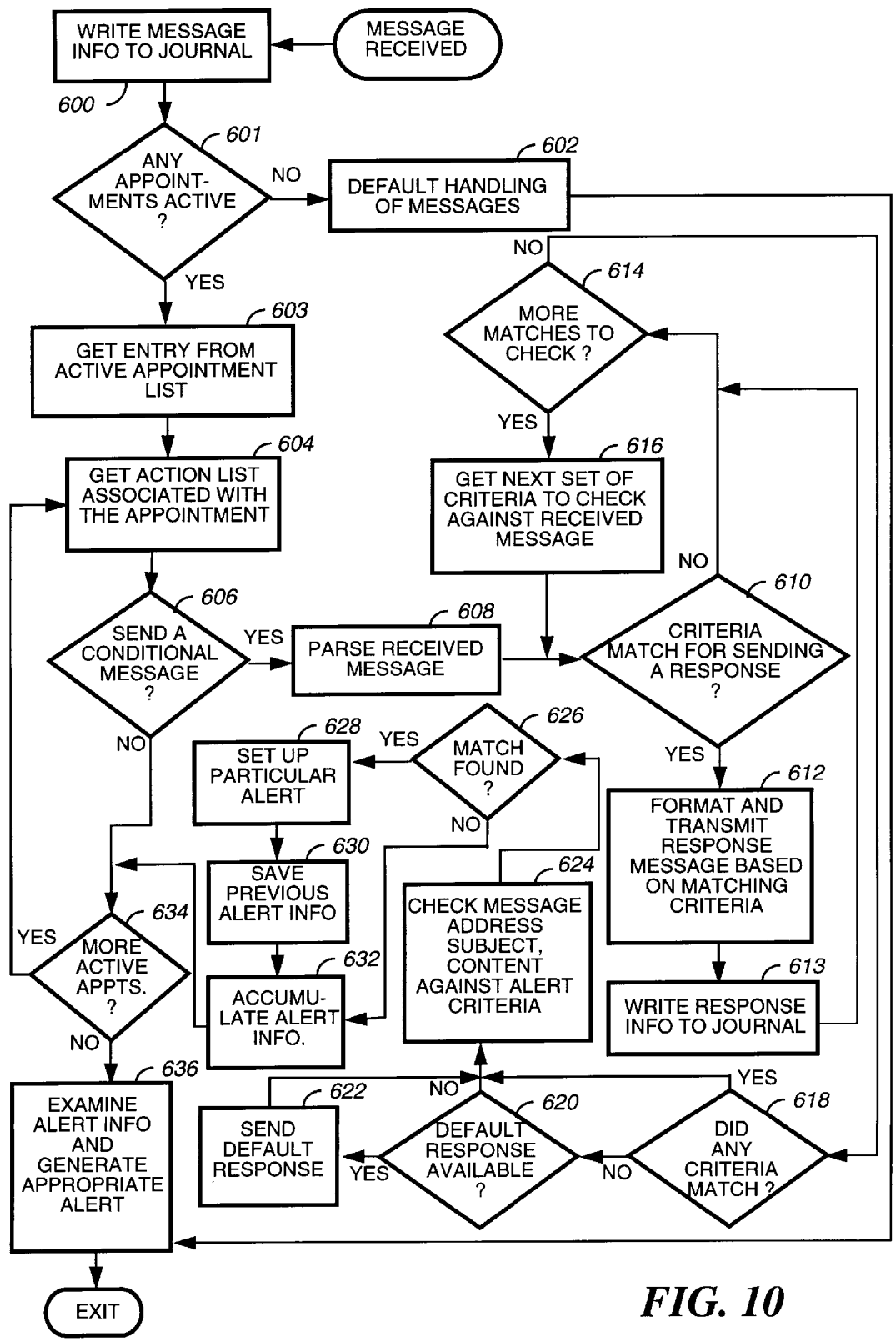
FIG. 10 is a flow chart of a message reception processing routine according to the present invention.

FIG. 10 illustrates a routine for processing received messages. This routine runs each time a message is received by the communication device. In step 600, the fact that a message was received is written into the journal, including the time and source of the message, for example. In step 601, it is determined whether any appointments are active. If no appointments are active, then in step 602, the received messages are processed according to default parameters set in the device. If there is an appointment active, then in step 603, the appointment is retrieved from the active appointment list and in step 604, the action list associated with the appointment is retrieved. In step 606, it is determined whether an action associated with the active appointment is a conditional outgoing message action. If it is, then in step 608 the received message is parsed and in step 610, it is determined based upon the received message whether the criteria for sending a response message is met. If the criteria is met, then in step 612, the response message is formatted and transmitted based upon the matching criteria. In step 613, the fact that a response was sent, and possibly the content and address of the response, is stored in the journal.

In step 614, it is determined whether there are additional criteria matches to check, and if so, then in step 616, the next set of criteria is retrieved to check against the received message, and steps 610 and 612 are repeated.

In step 618, it is determined whether any criteria matched for sending a response message, and if not, then a default response message is sent, if one is programmed, in steps 620 and 622.

In step 624, the message address, subject, and/or content is checked against the stored set of alert criteria for the active appointment. If a match is found in step 626, then the corresponding alert information is set, but the alert is not yet issued, in step 628, and the previous alert information is stored in step 630. In step 632, the alert information for all possible stored alert criteria is accumulated. Then in step 634, it is determined whether there are additional active appointments. If there are, then the process repeats from step 603. If there are not, then in step 636, the accumulated alert information is examined and the appropriate alert(s) is/are generated.

Figure 11:
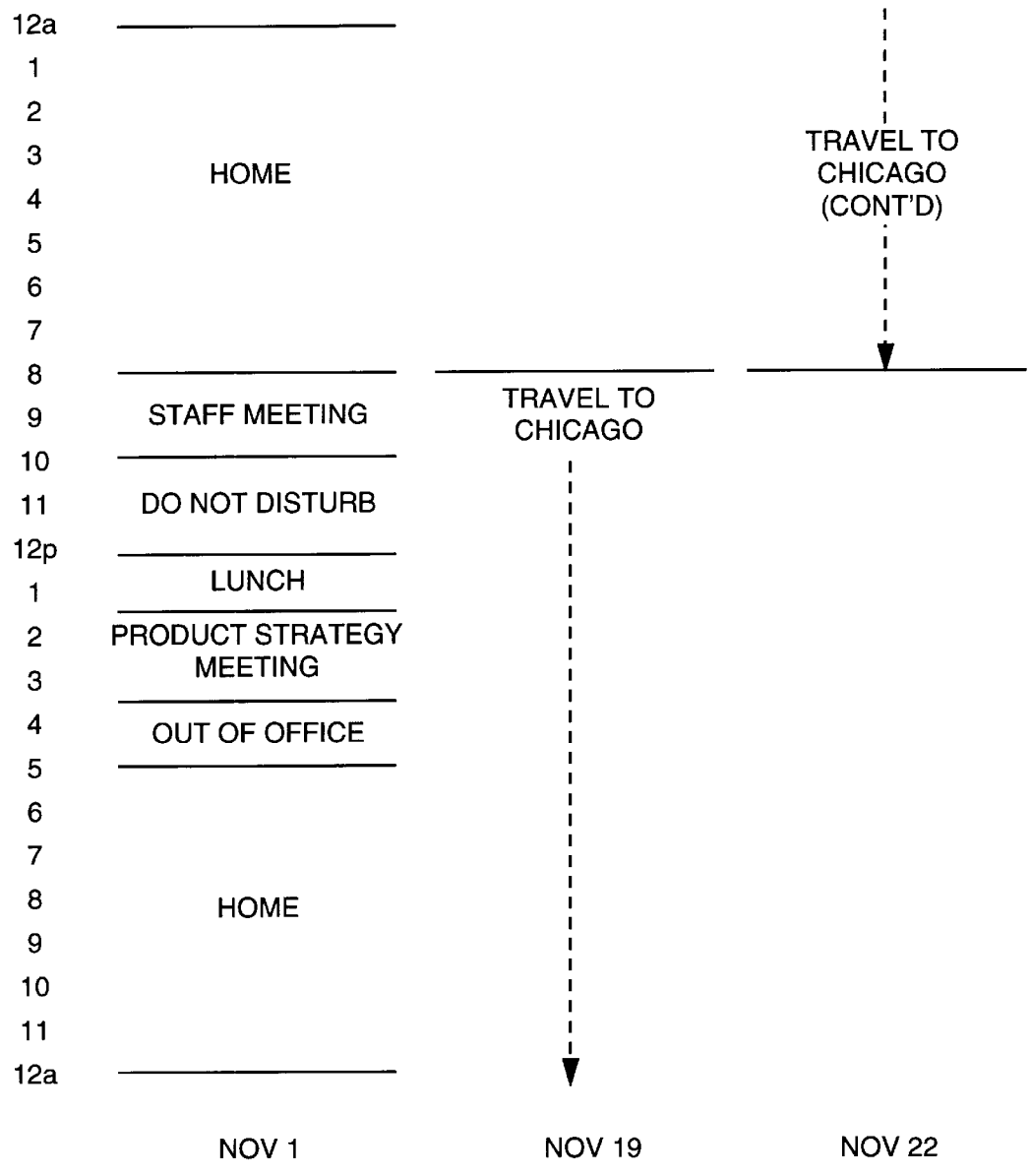
FIG. 11 is a diagram of appointment book entry examples.

Turning to FIGS. 11 and 12, an example of how a communication device according to the present invention operates during a typical day is described. The configuration information shown in FIG. 12 corresponds to the three days in the appointment shown in FIG. 11. The conditional and unconditional actions specified by the configuration information are shown in FIG. 12.

On November 1, between the hours of 12 AM and 8 AM, HOME is the appointment programmed and the communication device is programmed on November 1 to be in a silent alert mode. If a message is received during this appointment, the sender will automatically receive a reply message instructing him/her to call the user at home if it is urgent. At 8 AM on November 1, the user is at work and has a meeting scheduled until 10 AM. The appointment is a STAFF MEETING/LEADING. The configuration information for this appointment is programmed so that, unconditionally, ten minutes prior to the meeting, all attendees of the meeting, whose names and address are extracted from the appointment entry, are sent a message to remind them of the meeting. During the meeting, if the user receives a message from his/her boss, the communication device will emit a "chirp" alert. If anyone sends him a message with "911" in the message body, the communication device will emit a special beep and send a response message indicating that the user will respond as soon as possible. If any other messages are received during this appointment, the communication device will send a response message indicating that he/she is in a meeting. In addition, the communication device will examine the appointment book to locate a time slot when the user is available and return that information in response messages to anyone else who sends a message during the meeting.

At 10 AM on November 1, the appointment is DO NOT DISTURB. The communication device will send a message to the user's secretary (identified by address, etc.) indicating to the secretary to "Handle All Calls". If any messages are received during this appointment (except those from the secretary), they will be forwarded to the secretary for disposition. If the secretary wants to reach the user or is unable to handle one of the messages, it can be sent back to the user. The user will notice that the message is from the secretary, and the device will beep and display the message.

At 12 PM, the secretary will receive a message indicating that the user is at lunch.

At 1 PM, the appointment is MEETING/ATTENDEE, indicating that the user is attending a meeting (not leading it). If during this appointment a message is received from the user's boss or a message includes "911" in its contents, then the device will take certain special actions. Otherwise, the alert will be a vibrate alert.

At 3 PM, the appointment programmed is OUT OF OFFICE. The secretary will receive a message indicating the user's destination extracted from the appointment book entry. The device is further programmed to instruct the electronic mail server (or his personal computer at synchronization time) to forward electronic mail to his communication device. This executable application is explained further in FIG. 12. In addition, if a message is received from the user's boss, a response message will be sent including an indication of the user's location and the device will vibrate. If anyone else sends a message, a response message will be sent indicating that the user is unavailable.

At 5 PM, the appointment HOME is the appointment and the actions associated with that appointment take over control of the device.

Looking ahead to the appointment TRAVEL TO CHICAGO scheduled for November 19–22, this appointment will cause an executable application to run in order to locate airline schedules and airfare options. This executable application is explained further in conjunction with FIG. 14.

The applications that can be executed upon reaching a particular appointment are numerous. Referring to FIG. 1, the PC 130 includes a companion software program that synchronizes a stored appointment book with the appointment book in the communication device 100. The controller of the communication device 100 is programmed to cause electronic mail messages sent to a personal computer to be forwarded to the communication device 100 during an appointment.

Figure 13:
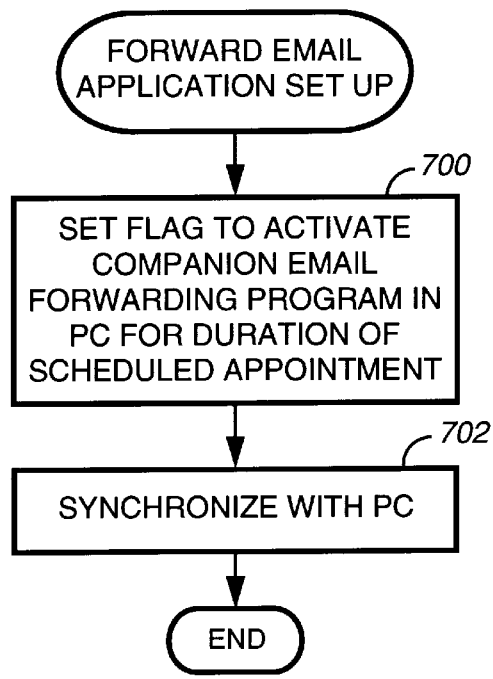
FIG. 13 is a flow chart illustrating an electronic mail forwarding application according to the present invention.

The electronic mail (email) forwarding application is selected for activation when a travel appointment, or any other particular appointment, is entered. Referring to FIG. 13 in conjunction with FIGS. 1 and 3, the email forwarding application will be described. When active, in step 700 a flag is set to activate a companion program in the PC to forward email for the duration of the scheduled appointment. In step 702, the appointment and associated configuration information in the communication device 100 is synchronized with that of the companion program in the PC 130 (normally at least once a day). Once synchronized, the email forwarding program in the PC 130 is activated at the appropriate time corresponding to the scheduled appointment, to automatically forward email that it receives to the communication device 100.

Figure 14:
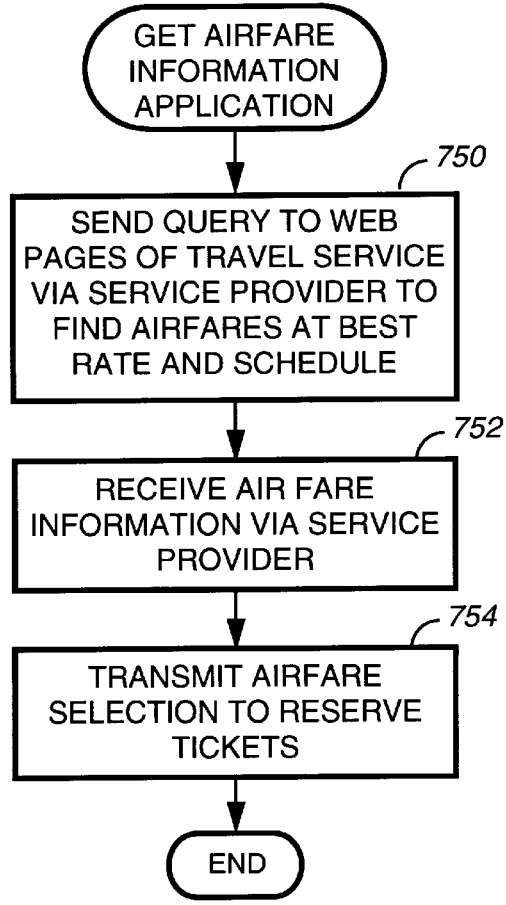
FIG. 14 is a flow chart illustrating an application for sending information solicitation messages in accordance with the present invention.

Another application is shown in FIG. 14, and will be explained in conjunction with FIG. 3. This application is triggered in association with a travel appointment. In general, this application sends a message queries via the terminal controller 216 to the internet/world wide web 220 to solicit responses and information. One utility in particular is to obtain airline schedule and airfare information. In step 750, the communication device transmits a message consisting of a search query to the world wide web pages of a travel service or airlines to find airfare information for a particular destination and schedule (defamed in the appointment). This message is transmitted to the service provider base station 200 for the communication device 100, which in turn is forwarded by the terminal controller 216 to the internet. The search is performed and the information for the flights that most closely matches the criteria of the query is sent back to the communication device 100 where it is received and displayed to the user in step 752. In step 754, the user can select the flight that is most desirable and transmits the selection, through the service provider base station 200, to the airline or travel service web page in order to reserve the tickets.

Yet another application that is useful for a travel appointment type is one that automatically adjusts the time that is displayed by the communication device according to the travel destination entered. For example, if the user resides in New York and enters a travel appointment for a trip to San Francisco, the application program automatically adjusts the clock time by 3 hours when the appointment is reached, or at some programmed lag time from then to account to travel time to the destination.

The applications shown in FIGS. 13 and 14 are examples of the many other types of applications that may be executed with the use of the appointment book information.

In summary, the present invention is directed to a communication device comprising:
 a receiver for receiving radio frequency signals representing transmitted information; and
 a controller coupled to the receiver, the controller being programmed to:
  store information representing an appointment book and configuration information specifying actions to be performed by the communication device with respect to appointments in the appointment book;
  monitor appointment entries in the appointment book in real time; and
  perform actions defined by the configuration information synchronized to appointments in the appointment book.

The present invention is also directed to a method for coordinating operations of a communication device with a daily appointment schedule, the method comprising steps of:
 storing in a communication device information representing the appointment book;
 storing configuration information specifying actions to be taken by the communication device for each appointment; and
 performing an action in synchronized to the appointment book.

The above description is intended by way of example only and is not intended to limit the present invention in any way except as set forth in the following claims.

What is claimed is:

1. A portable communication device comprising:
 a receiver for receiving radio frequency signals representing transmitted information;
 a controller coupled to the receiver, the controller being programmed to:
  store information representing an appointment book and configuration information specifying actions to be performed by the communication device with respect to appointments in the appointment book;
  monitor appointment entries in the appointment book in real time; and
  perform actions defined by the configuration information synchronized to appointments in the appointment book and;
 a transmitter coupled to the controller for transmitting radio frequency signals, wherein the controller is further programmed to store configuration information including appointment types and corresponding actions to be taken by the portable communication device, the actions to be taken including at least one of: transmitting a conditional response message, transmitting an unconditional outgoing message, changing an operational mode of the communication device or executing a stored application.

2. The portable communication device of claim 1, wherein the controller is further programmed to store configuration information including appointment types and corresponding actions to be taken by the communication device, the actions to be taken including generating a particular alert in response to receiving a message during an appointment.

3. The portable communication device of claim 1, wherein the controller is programmed to perform actions including transmitting stored response messages in response to receiving an incoming message matching predetermined criteria.

4. The portable communication device of claim 3, wherein the controller is programmed to store predetermined criteria for triggering transmission of a response message to an incoming message, the predetermined criteria comprising at least one of a source of the incoming message, subject of the incoming message, or content of the incoming message.

5. The portable communication device of claim 2, wherein the controller is programmed to perform actions including transmitting an outgoing message within a predetermined period of time before or after an appointment.

6. The portable communication device of claim 2, wherein the controller is programmed to perform actions including generating a particular alert in response to receiving a message which matches a predetermined set of criteria including at least one of message content, message subject or message source.

7. In combination, the portable communication device of claim 2 and a personal computer, the personal computer storing a companion program which manages an appointment book synchronized to the appointment book in the portable communication device, and wherein the controller of the portable communication device is programmed to cause the companion program in the personal computer to forward electronic mail messages received by the personal computer to the portable communication device during an appointment.

8. The portable communication device of claim 2, wherein the controller is programmed to perform actions including transmitting message queries for information from the internet, which information is received by the communication device.

9. The portable communication device of claim 1, wherein the controller is further programmed to:
   store a queue of response messages to be transmitted;
   display each response message to be transmitted for review by a user; and
   send or cancel a response message in response to user input.

10. The portable communication device of claim 1, wherein the controller is further programmed to store information in a journal for actions that are performed during an appointment.

11. The portable communication device of claim 10, wherein the controller is further programmed to display information in the journal, including information for actions performed for a completed appointment.

12. The portable communication device of claim 2, and further comprising a transmitter coupled to the processor for transmitting radio frequency signals, wherein the controller is programmed to transmit a response message which includes information derived from an appointment in the appointment book.

13. The portable communication device of claim 2, wherein the controller is programmed to transmit the response message which includes information indicating times for available appointments within a predetermined period of time.

14. A selective call communication device comprising the portable communication device of claim 1, and further comprising a decoder coupled to the controller to decode signals derived from the radio frequency signals in order to extract address and corresponding message information therefrom.

15. The portable communication device of claim 1, wherein the controller is programmed to store configuration information specifying conditional actions and unconditional actions to be performed with respect to appointments, and wherein the controller performs conditional actions in response to predetermined events during an appointment and performs unconditional actions within a predetermined period of time before or after a corresponding appointment independent of any events during the corresponding appointment.

16. A method for synchronizing operations of a portable communication device with an appointment book stored therein, the method comprising steps of:
   storing in a communication device information representing the appointment book wherein the information comprises information defining appointment types and corresponding actions to be taken by the portable communication device;
   storing configuration information specifying actions to be taken by the portable communication device for each appointment, wherein the actions to be taken including at least one of: transmitting a conditional response message, transmitting an unconditional outgoing message, changing an operational mode of the communication device or executing a stored application; and
   performing an action in synchronization with the appointment book.

17. The method of claim 16, wherein the step of storing configuration information comprises information defining appointment types and corresponding actions to be taken by the communication device, the actions to be taken further including generating a particular alert in response to receiving a message during an appointment.

18. The method of claim 17, and further comprising steps of:
   storing a queue of response messages to be transmitted;
   displaying each response message to be transmitted for review by a user; and
   sending or canceling a response message in response to user input.

19. The method of claim 17, and further comprising the step of storing information in a journal representing actions performed during an appointment.

20. The method of claim 19, wherein the step of performing actions further comprises displaying information from the journal which indicates actions performed at the completion of an appointment.

21. A portable communication device comprising:
   a receiver for receiving radio frequency signals representing incoming message information;
   a transmitter for transmitting radio frequency signals representing outgoing message information;
   a controller coupled to the receiver, the controller being programmed to:
      store information representing an appointment book and configuration information specifying actions to be performed by the portable communication device with respect to appointments in the appointment book including transmitting outgoing message information via the transmitter;
      monitor appointment entries in the appointment book in real time; and
      perform actions synchronized to the appointment book.

22. The portable communication device of claim 21, wherein the controller is programmed to store configuration information including appointment types and corresponding actions to be taken by the communication device, the actions to be taken including at least one of: transmitting a conditional response message, transmitting an unconditional outgoing message, generating a particular alert in response to receiving a message during an appointment, changing an operational mode of the communication device or executing a stored application.

23. The portable communication device of claim 21, wherein the controller is programmed to store configuration information specifying conditional actions and unconditional actions to be performed with respect to appointments, and wherein the controller performs conditional actions in response to predetermined events during an appointment and performs unconditional actions within a predetermined period of time before or after a corresponding appointment independent of any events during the corresponding appointment.

* * * * *